US012646771B2

(12) United States Patent
Kim et al.

(10) Patent No.: US 12,646,771 B2
(45) Date of Patent: Jun. 2, 2026

(54) SECONDARY BATTERY

(71) Applicant: Samsung SDI Co., Ltd., Yongin-si (KR)

(72) Inventors: Yong Chan Kim, Yongin-si (KR); Dong Hyuk Kim, Yongin-si (KR); Bo Hyun Kim, Yongin-si (KR); Mun Ho Nam, Yongin-si (KR); Jeong Won Oh, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 686 days.

(21) Appl. No.: 17/934,738

(22) Filed: Sep. 23, 2022

(65) Prior Publication Data

US 2023/0133220 A1 May 4, 2023

(30) Foreign Application Priority Data

Nov. 4, 2021 (KR) ........................ 10-2021-0150530

(51) Int. Cl.
*H01M 50/16* (2021.01)
*H01M 50/30* (2021.01)

(52) U.S. Cl.
CPC ........... *H01M 50/16* (2021.01); *H01M 50/30* (2021.01)

(58) Field of Classification Search
CPC .... H01M 50/16; H01M 50/30; H01M 50/183; H01M 50/489; H01M 50/10; H01M 50/593; H01M 10/613; H01M 10/6556; H01M 10/6561; H01M 50/15; H01M 50/3425; H01M 50/586; Y02E 60/10
See application file for complete search history.

(56) References Cited

U.S. PATENT DOCUMENTS

| | | | |
|---|---|---|---|
| 9,472,802 B2 | 10/2016 | Kim et al. | |
| 10,333,133 B2 | 6/2019 | Park et al. | |
| 2006/0216578 A1 | 9/2006 | Kwon et al. | |
| 2011/0159340 A1 | 6/2011 | Hu et al. | |
| 2012/0156531 A1* | 6/2012 | Guen ................. H01M 50/538 | |
| | | | 429/180 |
| 2013/0029188 A1 | 1/2013 | Kim et al. | |

(Continued)

FOREIGN PATENT DOCUMENTS

| | | |
|---|---|---|
| CN | 102903883 A | 1/2013 |
| KR | 20080066314 A | 7/2008 |

(Continued)

OTHER PUBLICATIONS

Extended European Search Report dated Mar. 30, 2023 issued in corresponding European Patent Application No. 22204892.8 (7 pages).

(Continued)

*Primary Examiner* — Ula C Ruddock
*Assistant Examiner* — Sarika Gupta
(74) *Attorney, Agent, or Firm* — Womble Bond Dickinson (US) LLP

(57) ABSTRACT

A secondary battery includes: an electrode assembly; a case accommodating the electrode assembly; a cap plate sealing the case; and an insulating member between the electrode assembly and the cap plate, and a relationship of M/E=R1 is satisfied, where M is a melting point (° C.) of the insulating member, E is an energy density (Wh/kg) of the secondary battery, and R1 is 0.5 to 3.5.

13 Claims, 4 Drawing Sheets

(56)                    References Cited

U.S. PATENT DOCUMENTS

| | | |
|---|---|---|
| 2017/0207439 A1 | 7/2017 | Park et al. |
| 2020/0091492 A1 | 3/2020 | Guen |
| 2020/0358152 A1 | 11/2020 | Shimizu et al. |

FOREIGN PATENT DOCUMENTS

| | | |
|---|---|---|
| KR | 2017-0087281 A | 7/2017 |
| KR | 2018-0112905 A | 10/2018 |
| KR | 102111203 B1 | 5/2020 |

OTHER PUBLICATIONS

Office Action issued by CNIPA on Aug. 26, 2025 for corresponding Chinese Patent Application No. 202211357776.X, 7 pages.
Communication Pursuant to Rule 114(2) EPC dated Oct. 15, 2025 for corresponding EP Patent Application No. 22204892.8, 18 pages.

\* cited by examiner

FIG. 2

SECONDARY BATTERY

CROSS-REFERENCE TO RELATED APPLICATION

This application claims priority to and the benefit of Korean Patent Application No. 10-2021-0150530, filed on Nov. 4, 2021 in the Korean Intellectual Property Office, the entire content of which is herein incorporated by reference.

BACKGROUND

1. Field

Aspects of embodiments of the present disclosure relate to a secondary battery.

2. Description of the Related Art

Unlike a primary battery that cannot be charged, a secondary battery is a rechargeable and dischargeable battery. A low-capacity secondary battery comprised of one single cell packaged in the form of a pack may be used for various portable small-sized electronic devices, such as cellular phones or camcorders, and a high-capacity secondary battery in which several tens of cells are connected in a battery pack is widely used as a power source for motor drives, such as those in hybrid vehicles or electric vehicles.

The secondary battery may be configured by incorporating into a case an electrode assembly provided by interposing a separator between a positive electrode and a negative electrode, and an electrolyte, and installing a cap plate on the case. Here, a representative example of the electrode assembly may be a winding type or a stack type. In such an electrode assembly, an uncoated portion tab may protrude in a lateral or upward direction, and a current collecting member may be connected to the uncoated portion tab.

The above information disclosed in this Background section is provided for enhancement of understanding of the background of the invention and, therefore, it may contain information that does not constitute prior art.

SUMMARY

According to an aspect of embodiments of the present disclosure, a secondary battery is capable of efficiently discharging internal heat to the outside through a vent hole in a short time by preventing or substantially preventing a vent hole blocking phenomenon by an electrode assembly when an event, such as bottom penetration, occurs in the secondary battery.

According to one or more embodiments of the present disclosure, a secondary battery includes: an electrode assembly; a case accommodating the electrode assembly; a cap plate sealing the case; and an insulating member between the electrode assembly and the cap plate, wherein a relationship of M/E=R1 is satisfied, where M is a melting point (° C.) of the insulating member, E is an energy density (Wh/kg) of the secondary battery, and R1 is 0.5 to 3.5.

R1 may be 1 to 3.

R1 may be 0.6 to 3.5.

A relational expression R1*T=R2 may be satisfied, where T is a time (seconds) taken for heat to be propagated to another secondary battery adjacent to the secondary battery, and R2 is 10 to 170.

R2 may be 50 to 80.

R2 may be 46 to 170.

The insulating member may include polytetrafluoroethylene (PTFE), polyphenylene sulfide (PPS), polyphenylene (PP), or polyether ether ketone (PEEK).

The insulating member may further include a member vent hole, and the cap plate may include a plate vent hole provided in a region corresponding to the member vent hole and a safety vent may be attached to the plate vent hole.

A relational expression (A1/A2)/E=R3 may be satisfied, where A1 is a size of the insulating member (mm²), A2 is a size of the member vent hole (mm²), and R3 is 0.01 to 0.1.

The size of the member vent hole may be the same as or smaller than that of the plate vent hole.

The insulating member may be in close contact with the cap plate and may be spaced apart from the electrode assembly.

The member vent hole may be blocked by the safety vent.

BRIEF DESCRIPTION OF DRAWINGS

FIG. 2 is a cross-sectional view of a secondary battery according to an embodiment of the present disclosure.

DETAILED DESCRIPTION

Figure 1:
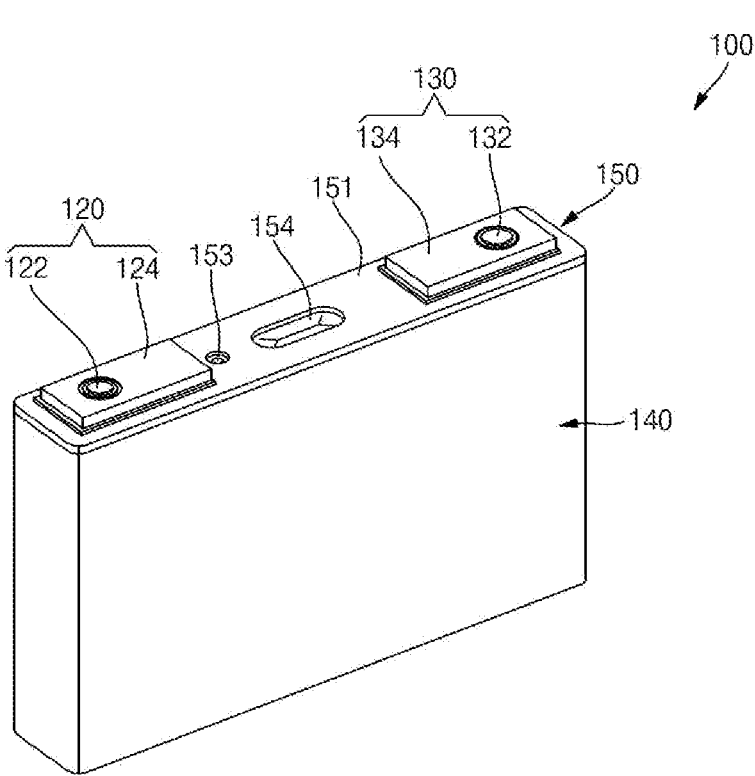
FIG. 1 is a perspective view illustrating a secondary battery according to an embodiment of the present disclosure.

Herein, some embodiments of the present invention will be described in further detail with reference to the accompanying drawings.

Some examples of the present invention are provided to more completely explain the present invention to those skilled in the art; however, the following examples may be modified in various other forms. That is, the present invention may be embodied in many different forms and should not be construed as being limited to the example embodiments set forth herein. Rather, these example embodiments are provided so that this disclosure will be thorough and complete and will convey the aspects and features of the present invention to those skilled in the art.

In addition, in the accompanying drawings, sizes or thicknesses of various components may be exaggerated for brevity and clarity. Like numbers refer to like elements throughout. As used herein, the term "and/or" includes any and all combinations of one or more of the associated listed items. In addition, it is to be understood that when an element A is referred to as being "connected to" an element B, the element A may be directly connected to the element B or one or more intervening elements C may be present therebetween such that the element A and the element B are indirectly connected to each other.

The terminology used herein is for the purpose of describing particular embodiments and is not intended to be limiting of the disclosure. As used herein, the singular forms are intended to include the plural forms as well, unless the context clearly indicates otherwise. It is to be further understood that the terms "comprise" and/or "comprising" when used in this specification, specify the presence of stated features, numbers, steps, operations, elements, and/or components, but do not preclude the presence or addition of one or more other features, numbers, steps, operations, elements, components, and/or groups thereof.

It is to be understood that, although the terms "first," "second," etc. may be used herein to describe various members, elements, regions, layers, and/or sections, these members, elements, regions, layers, and/or sections should not be limited by these terms. These terms are used to distinguish one member, element, region, layer, and/or section from another. Thus, for example, a first member, a first element, a first region, a first layer, and/or a first section discussed below could be termed a second member, a second element, a second region, a second layer, and/or a second section without departing from the teachings of the present invention.

Spatially relative terms, such as "beneath," "below," "lower," "above," "upper," and the like, may be used herein for ease of description to describe one element or feature's relationship to another element(s) or feature(s) as illustrated in the figures. It is to be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the example term "below" can encompass both an orientation of above and below.

Here, the same reference numerals are given to parts having similar configurations and operations throughout the specification. In addition, when a part is said to be connected, coupled, or electrically coupled with another part, this includes not only the case in which it is directly connected, coupled, or electrically coupled, but also the case in which it is connected, coupled, or electrically coupled with one or more other elements interposed therebetween.

Unless otherwise defined, all terms (including technical and scientific terms) used herein have the same meaning as commonly understood by one of ordinary skill in the art to which the inventive concept pertains. It is also to be understood that terms defined in commonly used dictionaries should be interpreted as having meanings consistent with the meanings in the context of the related art, and are expressly defined herein unless they are interpreted in an ideal or overly formal sense.

Figure 2:
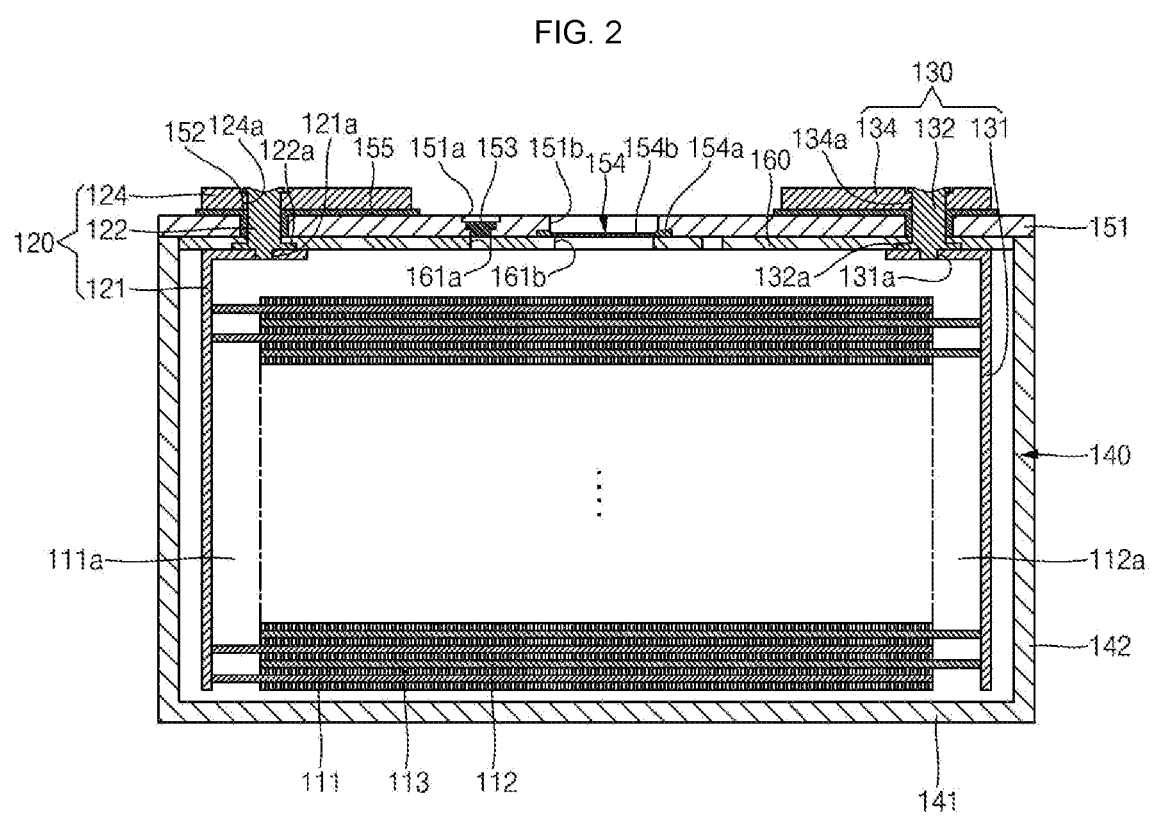
Figure 3:
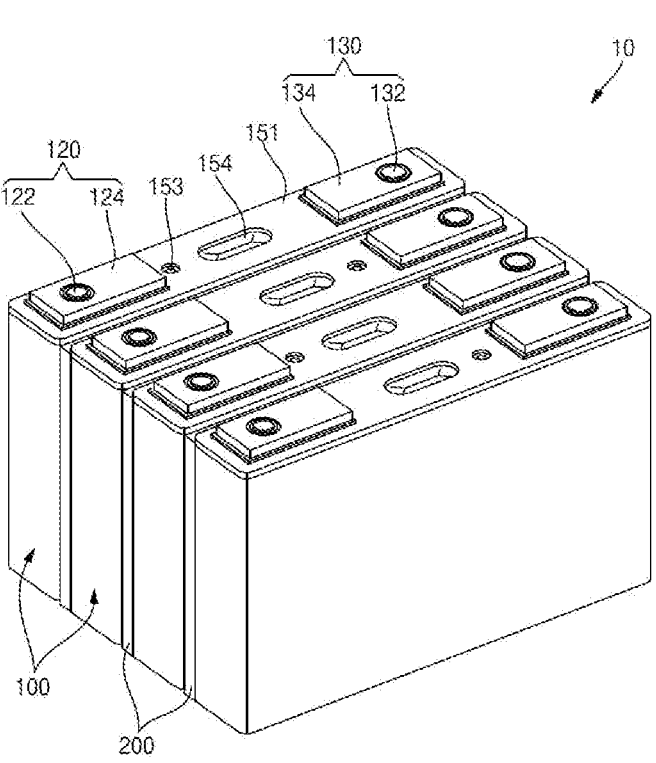
FIG. 3 is a perspective view illustrating a battery module to which the secondary battery of FIG. 1 is applied, according to an embodiment of the present disclosure.

FIGS. 1 and 2 are a perspective view and a cross-sectional view of a secondary battery according to an embodiment. FIG. 3 is a perspective view of a battery module in which the secondary battery of FIG. 1 is alternately disposed with an insulating sheet.

In the embodiment shown in FIGS. 1 and 2, a secondary battery 100 according to an embodiment may include an electrode assembly 110, a first terminal 120, a second terminal 130, a case, or can, 140, a cap assembly 150, and an insulating member 160.

The electrode assembly 110 may be provided by winding or overlapping a laminate of a first electrode plate 111, a separator 113, and a second electrode plate 112, which are in forms of a thin plate or film. In some examples, the electrode assembly 110 may have a winding axis in a horizontal direction (that is, a direction parallel or substantially parallel to a longitudinal direction of the cap assembly 150 and the insulating member 160) or may be wound in a vertical direction (that is, a direction perpendicular or substantially perpendicular to the cap assembly 150 and the insulating member 160). In some examples, the electrode assembly 110 may be of a winding type or a stack type. In some examples, the electrode assembly 110 may be stacked such that two or more electrode assemblies 110 have long sides adjacent to each other.

In some examples, the first electrode plate 111 of the electrode assembly 110 may function as a negative electrode, and the second electrode plate 112 may function as a positive electrode. However, the reverse is also possible.

In some examples, the first electrode plate 111 may be provided by coating a first electrode active material, such as graphite or carbon, on a first electrode current collector provided as a metal foil, such as copper, a copper alloy, nickel, or a nickel alloy, and may include a first electrode tab (or a first uncoated portion) 111a to which the first electrode active material is not applied. The first electrode tab 111a may be a passage for current flow between the first electrode plate 111 and the first terminal 120.

In some examples, the first electrode tab 111a may be provided by being cut to protrude from a side in advance when the first electrode plate 111 is manufactured, and may be formed integrally with the first electrode plate 111.

In some examples, a plurality of first electrode tabs 111a may be collected and welded (e.g., tack-welded), and a first current collector plate 121 of the first terminal 120 may be welded to the welded (e.g., tack-welded) first electrode tab 111a to then be coupled thereto.

In some examples, the second electrode plate 112 is provided by coating a second electrode active material, such as a transition metal oxide, on a second electrode current collector provided with a metal foil, such as aluminum or an aluminum alloy, and may include a second electrode tab (or a second uncoated portion) 112a to which the second electrode active material is not applied. The second electrode tab 112a may be a passage for current flow between the second electrode plate 112 and the second terminal 130.

In some examples, the second electrode tab 112a may be provided by being cut to protrude from a side in advance when the second electrode plate 112 is manufactured, and may be formed integrally with the second electrode plate 112.

In some examples, a plurality of second electrode tabs 112a may be collected and welded (e.g., tack-welded), and a second current collector plate 131 of the second terminal 130 may be welded to the welded (e.g., tack-welded) second electrode tab 112a to then be coupled thereto.

In some examples, the first electrode tab 111a may be located on a short side end of the electrode assembly 110, and the second electrode tab 112a may be located on another short side end of the electrode assembly 110.

In some examples, the separator 113, which is positioned between the first electrode plate 111 and the second electrode plate 112, may prevent or substantially prevent a short circuit and enable the movement of lithium ions, and may include polyethylene, polypropylene, or a composite film of polyethylene and polypropylene. In some examples, the separator 113 may be replaced with an inorganic solid electrolyte, such as a sulfide-based, oxide-based, or phosphate compound-based electrolyte that does not require a liquid or gel electrolyte.

In some examples, the first terminal 120 and the second terminal 130, which are respectively electrically connected to the first electrode uncoated portion 111a of the first electrode plate 111 and the second electrode uncoated portion 112a of the second electrode plate 112, may be positioned at opposite ends of the electrode assembly 110.

In some examples, the electrode assembly 110 may be accommodated in the case 140 together with an electrolyte. In some examples, the electrolyte may include a lithium salt, such as $LiPF_6$ or $LiBF_4$, in an organic solvent, such as ethylene carbonate (EC), propylene carbonate (PC), diethyl carbonate (DEC), ethylmethyl carbonate (EMC), or dimethyl carbonate (DMC). In addition, the electrolyte may be in liquid or gel phase. In some examples, when an inorganic solid electrolyte is used, the electrolyte may be omitted.

The first terminal 120 may be provided as a metal and may be electrically connected to the first electrode plate 111. In some examples, the first terminal 120 may include the first current collector plate 121, a first terminal post 122, and a first terminal plate 124. In some examples, the first current collector plate 121 may be in contact with the first electrode uncoated portion 111a protruding from an end of the electrode assembly 110. The first current collector plate 121 may be welded to the first electrode uncoated portion 111a. In some examples, the first current collector plate 121 is provided in an approximately "⌐" shape, and a terminal hole 121a may be provided at an upper portion thereof. In some examples, the first terminal post 122 may be inserted into the terminal hole 121a to be riveted and/or welded. In some examples, the first current collector plate 121 may be made of copper or a copper alloy.

In some examples, the first terminal post 122 may protrude and extend by a length (e.g., a predetermined length) upward through a cap plate 151 of the cap assembly 150 and may be electrically connected to the first current collector plate 121 under the cap plate 151. In addition, in some examples, the first terminal post 122 may protrude and extend by a length (e.g., a predetermined length) upward from the cap plate 151, and a flange 122a may be provided under the cap plate 151 to prevent or substantially prevent the first terminal post 122 from being dislodged from the cap plate 151. In the first terminal post 122, a region positioned below the flange 122a may be inserted into the first terminal hole 121a of the first current collector plate 121 and then riveted and/or welded. In some examples, the first terminal post 122 may be made of copper, a copper alloy, aluminum, or an aluminum alloy.

The first terminal plate 124 may have a hole 124a, and the first terminal post 122 may be coupled to the hole 124a, and then be riveted and/or welded. In some examples, an interface between the first terminal post 122 that is exposed upward and the first terminal plate 124 may be welded to each other. For example, by providing a laser beam to boundary regions of the first terminal post 122 that is exposed upward and the first terminal plate 124, the boundary regions may be melted and then cooled and welded to each other. In some examples, the first terminal post 122 and the first terminal plate 124 may be electrically insulated from the cap plate 151.

The second terminal 130 may also be made of a metal and may be electrically connected to the second electrode plate 112. In some examples, the second terminal 130 may include the second current collector plate 131, a second terminal post 132, and a second terminal plate 134. The second current collector plate 131 may be in contact with the second electrode uncoated portion 112a protruding from an end of the electrode assembly 110. In some examples, the second current collector plate 131 may be provided in an approximately "⌐" shape, and a terminal hole 131a may be provided at an upper portion thereof. In some examples, the second terminal post 132 is fitted and coupled to the terminal hole 131a. The second current collector plate 131 may be made of, for example, but is not limited to, aluminum or an aluminum alloy. The second terminal post 132 may protrude and extend upward by a length (e.g., a predetermined length) through the cap plate 151, to be described later, and may be electrically connected to the second current collector plate 131 under the cap plate 151. The second terminal post 132 may protrude and extend by a length (e.g., a predetermined length) upward from the cap plate 151, and a flange 132a may be provided under the cap plate 151 to prevent or substantially prevent the second terminal post 132 from being dislodged from the cap plate 151. In the second terminal post 132, a region positioned below the flange 132a may be inserted into a second terminal hole 131a of the second current collector plate 131 and then riveted and/or welded.

In some examples, the second terminal post 132 may be made of aluminum or an aluminum alloy. The second terminal plate 134 may have a hole 134a. In addition, the second terminal plate 134 may be coupled to the second terminal post 132. That is, the second terminal post 132 may be coupled to the hole 134 of the second terminal plate 134. In addition, the second terminal post 132 and the second terminal plate 134 may be riveted and/or welded to each other. In some examples, boundary regions of the second terminal post 132 that is exposed upward and the second terminal plate 134 may be welded to each other. For example, by providing a laser beam to boundary regions of the second terminal post 132 that is exposed upward and the second terminal plate 134, the boundary regions may be melted and then cooled and welded to each other.

In some examples, the second terminal post 132 and the second terminal plate 134 may be electrically insulated from the cap plate 151. In some examples, the second terminal post 132 and the second terminal plate 134 may be electrically connected to the cap plate 151. Here, the cap plate 151 of the cap assembly 150 may have a same polarity (e.g., a positive polarity) as the second terminal 130.

In some examples, the case 140 may be shaped of a substantially hollow rectangular parallelepiped having an opening therein. Through the opening, the electrode assembly 110 may be inserted into the case 140. In addition, the first current collector plate 121 of the first terminal 120 and the second current collector plate 131 of the second terminal 130 may also be located inside the case 140. In some examples, the case 140 may include a rectangular bottom surface 141 and four side surfaces 142 that extend in or approximately in the vertical direction from four sides of the bottom surface 141.

The cap assembly 150 may be coupled to the case 140. In some examples, the cap assembly 150 may include the cap plate 151, a seal gasket 152, a plug 153, a safety vent 154, and an upper coupling member 155.

The cap plate 151 may seal the opening of the case 140 and may be made of a same material as the case 140. In some examples, the cap plate 151 may be coupled to the case 140 by laser welding. In some examples, the cap plate 151 may have a same polarity as the second terminal 130 as described above, and, thus, the cap plate 151 and the case 140 may have the same polarity.

The cap plate 151 may further include an electrolyte injection hole 151a and a plate vent hole 151b, which pass through between upper and lower surfaces of the cap plate 151. The cap plate 151 may further include a first terminal hole 156 and a second terminal hole 157 (see FIG. 4), through which the first terminal post 122 and the second terminal post 132 pass.

The seal gasket 152 made of an insulating material is provided between the cap plate 151 and the first terminal post 122 of the first terminal 120 and between the cap plate 151 and the second terminal post 132 of the second terminal 130, to seal between each of the first terminal post 122 and the second terminal post 132 and the cap plate 151. The seal gasket 152 prevents or substantially prevents external moisture from penetrating into the secondary battery 100 and prevents or substantially prevents the electrolyte contained in the secondary battery 100 from leaking to the outside.

The plug 153 may seal the electrolyte injection hole 151a after the electrolyte is injected into the case 140 through the electrolyte injection hole 151a of the cap plate 151. The safety vent 154 may be installed in the plate vent hole 151b of the cap plate 151 and may include a notch 154x to be opened at a certain pressure (e.g., a set pressure).

The upper coupling member 155 may be provided between each of the first terminal post 122 and the second terminal post 132 and the cap plate 151 on an upper portion of the cap plate 151. Also, the upper coupling member 155 may be in close contact with the cap plate 151. Further, the upper coupling member 155 may also be in close contact with the seal gasket 152. The upper coupling member 155 may insulate the first terminal post 122 and the second terminal post 132 from the cap plate 151. In some examples, the upper coupling member 155 that is interposed between the second terminal plate 134 and the cap plate 151 may electrically connect the second terminal plate 134 and the cap plate 151 to each other, and, thus, the cap plate 151 may have the same polarity as the second terminal 130.

As shown in FIG. 3, a battery module 10 may include a plurality of secondary batteries 100 and an insulating sheet 200 interposed between the secondary batteries 100. The insulating sheet 200 may be interposed between long sides of pairs of adjacent secondary batteries 100. The battery module 10 may further include an end plate and a side plate surrounding the plurality of secondary batteries 100. In some examples, the insulating sheet 200 may include an insulating material, such as mica, capable of blocking heat propagation between two adjacent secondary batteries 100.

Figure 4:
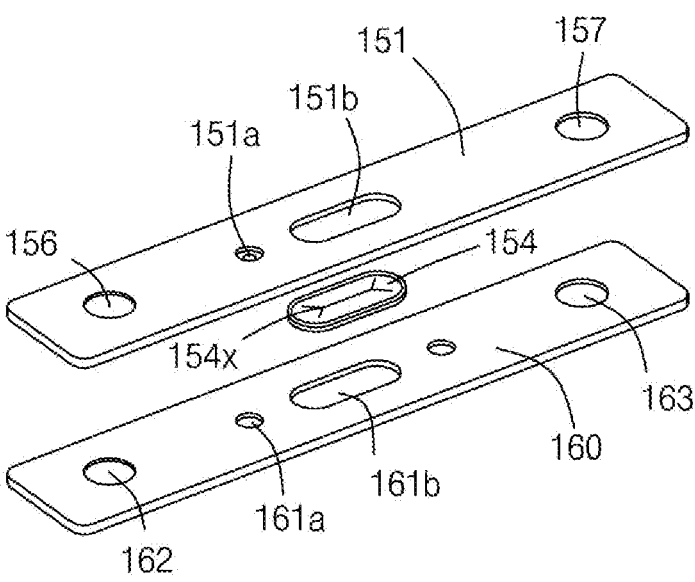
FIG. 4 is a perspective view illustrating a relationship between a cap plate and an insulating member in a secondary battery according to an embodiment of the present disclosure.

FIG. 4 is a perspective view illustrating a relationship between the cap plate 150 and the insulating member 160 in the secondary battery 100 according to an embodiment of the present disclosure. Here, reference is also made to FIG. 2.

The insulating member 160 may be provided in a size approximately corresponding to the size of the cap plate 151. In some examples, the insulating member 160 may be an approximately rectangular flat plate. In some examples, the insulating member 160 may be in close contact with a lower surface of the cap plate 151 and may be spaced apart from the electrode assembly 110 by a distance (e.g., a predetermined distance). In some examples, the insulating member 160 may include an electrolyte injection hole 161a and a member vent hole 161b provided at positions corresponding to the electrolyte injection hole 151a and the plate vent hole 151b provided in the cap plate 151. In some examples, electrolyte injection holes 161a are provided on both sides of the member vent hole 161b, and, thus, the electrolyte may be easily injected regardless of the assembly direction of the insulating member 160 during a battery assembling process. In some examples, the insulating member 160 may further include a first terminal hole 162 and a second terminal hole 163 provided at positions corresponding to the first terminal hole 156 and the second terminal hole 157 of the cap plate 151.

In this way, the insulating member 160 may prevent or substantially prevent an undesired short circuit between the first current collector plate 121 and the cap plate 151, and may prevent or substantially prevent an undesired short circuit between the second current collector plate 131 and the cap plate 151. In addition, the insulating member 160 may also prevent or substantially prevent an undesired short circuit between the electrode assembly 110 and the cap plate 151.

In some examples, between a melting point M (° C.) of the insulating member 160 and an energy density E (Wh/kg) of the secondary battery 100, a relationship of M/E=R1 may be satisfied. In an embodiment, R1 is approximately 0.5 to approximately 3.5, and, in an embodiment, approximately 1 to approximately 3, and, in an embodiment, approximately 0.6 to approximately 3.5.

For example, when R1 is less than approximately 0.5, the melting point and/or tensile strength of the insulating member 160 is relatively low, compared to the energy density of the secondary battery 100, and, thus, when an event occurs in the secondary battery 100 (for example, when the bottom of the secondary battery is penetrated by a nail), the insulating member 160 may be melted at a relatively low temperature. Accordingly, during an event of the secondary battery 100, the insulating member 160 may be melted, and the plate vent hole 151b of the cap plate 151 may be directly blocked by the electrode assembly 110. Thus, the internal heat of the secondary battery 100 may not be quickly discharged to the outside, such that the cap plate 151 may be blasted, or the case 140 may be damaged. In addition, heat may be quickly propagated from the secondary battery where the event has occurred to another secondary battery adjacent thereto, such that a chain of events may occur.

According to embodiments, when R1 is approximately 0.5 to approximately 3.5, a melting point and/or tensile strength of the insulating member 160 is relatively high, compared to the energy density of the secondary battery 100, and, thus, when an event occurs in the secondary battery 100 (for example, when the bottom of the secondary battery is damaged by a nail), the insulating member 160 may not be melted. Accordingly, during an event of the secondary battery 100, the insulating member 160 is not melted and maintains a certain shape (e.g., a predetermined shape), thereby quickly discharging the internal heat of the secondary battery 100 to the outside through the member vent hole 161b of the insulating member 160 and the plate vent hole 151b of the cap plate 151, and, thus, the cap plate is not blasted, and the case 140 is not damaged. In addition, heat is not propagated from the secondary battery 100 where an event has occurred to another secondary battery adjacent thereto, thereby preventing or substantially preventing a chain of events from occurring.

In some examples, it may be difficult in practice to provide materials having R1 greater than approximately 3.5. In some examples, a material having R1 greater than 3.5 may be a ceramic or a metal, which not only increases the weight of the secondary battery but also causes additional problems inside the secondary battery (e.g., an internal short circuit) when the secondary battery is deformed.

In some examples, the insulating member 160 may include a resin having a relatively high tensile strength and/or melting point. In some examples, the insulating member 160 may include polytetrafluoroethylene (PTFE), polyphenylene sulfide (PPS), polyphenylene (PP), or polyether ether ketone (PEEK).

The properties of these materials are summarized in Table 1 below.

TABLE 1

| Resin | Melting Temperature (Tm, ° C.) | Heat Deflection Temperature (HDT, ° C.) |
|---|---|---|
| PTFE | 327 | 260 |
| PPS | 285 | 265 |
| PP | 165 | 120 |
| PEEK | 340 | 260 |

In some examples, a relational expression R1*T=R2 between R1 and a time (T, sec) taken for heat to be propagated to another secondary battery adjacent to the secondary battery is satisfied, and, in an embodiment, R2 is approximately 10 to approximately 170, and, in an embodiment, approximately 50 to approximately 80, and, in an embodiment, approximately 46 to approximately 170.

When R2 is approximately 10 to approximately 170, a sufficiently long time is taken for heat to be propagated from the secondary battery where an event has occurred to another secondary battery adjacent thereto, thereby preventing or substantially preventing a chain of events from occurring. When R2 is smaller than approximately 10, a short time is taken for heat to be propagated from the secondary battery where an event has occurred to another secondary battery adjacent thereto, such that a chain of events may occur in a battery module. When R2 is greater than approximately 170, it may be difficult in practice to provide materials satisfying this condition.

In some examples, between a size of the insulating member A1 (mm²), a size of the member vent hole A2 (mm²), and the energy density of the secondary battery E (Wh/kg), a relational expression (A1/A2)/E=R3 is satisfied, and, in an embodiment, R3 is approximately 0.01 to approximately 0.1 and, in an embodiment, approximately 0.01 to approximately 0.07. In some examples, a size of the member vent hole 161b may be the same as or smaller than that of the plate vent hole 151b. In some examples, the member vent hole 161b may be blocked by the safety vent 154.

When R3 is less than approximately 0.01, due to an increase in the size of the safety vent 154, it may not be easy to provide the first and second terminal plates 124 and 134 and the electrolyte injection hole 151a on the cap plate 151. In addition, when R3 is greater than approximately 0.1, during occurrence of an event, heat may not be easily discharged through the safety vent 154, and, thus, there is a risk of rupture, thermal runaway, or ignition and explosion. For example, when R3 is less than approximately 0.07, during occurrence of an event, heat may be easily discharged through the safety vent 154. In some examples, a rupture pressure of the notch 154x of the safety vent 154 may be approximately 10 kgf/cm².

Meanwhile, hazard levels of a secondary battery may be categorized from 0 to 7, and the secondary battery 100 according to embodiments of the present disclosure may be managed at a hazard level of 5 or less. For reference, the state of the secondary battery for each hazard level may be summarized as shown in Table 2 below.

TABLE 2

| Hazard level 0 | No change (No effect, no loss of functionality) |
|---|---|
| Hazard level 1 | Passive protection enabled (No defect, no leakage; no venting, no fire or flame; no rupture; no explosion; no exothermic reaction or thermal runaway. Cell reversibly damaged →Repair of protection needed) |

TABLE 2-continued

| Hazard level 2 | Defect/damage (No leakage; no venting, no fire or flame; no rupture; no explosion; no exothermic reaction or runaway. Cell irreversibly damaged →Repair needed |
|---|---|
| Hazard level 3 | Leakage mass < 50% (No venting, no fire or flame; no rupture; no explosion. Weight loss < 50% of electrolyte (solvent + salt) weight) |
| Hazard level 4 | Venting mass ≥ 50% (No fire or flame; no rupture; no explosion. Weight loss ≥ 50% of electrolyte (solvent + salt) weight) |
| Hazard level 5 | Fire or flame (No rupture; no explosion (i.e. no flying parts)) |
| Hazard level 6 | Rupture (No explosion, but flying parts of active mass) |
| Hazard level 7 | Explosion |

As described above, according to embodiments of the present disclosure, an insulating member having a high melting point and tensile strength is interposed between an electrode assembly and a cap plate, thereby preventing or substantially preventing a vent hole blocking phenomenon by the electrode assembly when an event (e.g., bottom penetration, etc.) occurs in a secondary battery. Accordingly, the internal heat of the secondary battery can be efficiently and quickly discharged to the outside through the insulating member and the vent hole of the cap plate in a short time when an event occurs in the secondary battery.

In addition, since the heat of the secondary battery is quickly discharged to the outside through the vent hole when an event occurs in the secondary battery, blast of the cap plate or rupture of the case, or can, may be prevented or substantially prevented.

In addition, by delaying a time taken for heat to be propagated to another secondary battery adjacent to the secondary battery, it is possible to suppress a chain of events from occurring in other adjacent secondary batteries.

While one or more embodiments have been described herein, the present disclosure is not limited thereto, and it will be understood by a person skilled in the art that various changes in form and details may be made therein without departing from the spirit and scope of the present disclosure as set forth in the following claims.

What is claimed is:

1. A secondary battery comprising:
an electrode assembly;
a case accommodating the electrode assembly;
a cap plate sealing the case; and
an insulating member between the electrode assembly and the cap plate,
wherein a relationship of M/E=R1 is satisfied, where M is a melting point (° C.) of the insulating member, E is an energy density (Wh/kg) of the secondary battery, and R1 is 0.5° C.·kg/Wh to 3.5° C.·kg/Wh; and
wherein a bottom surface of the insulating member is directly facing the electrode assembly at a center of the cap plate along a length of the cap plate.

2. The secondary battery of claim 1, wherein R1 is 1° C.·kg/Wh to 3° C.·kg/Wh.

3. The secondary battery of claim 1, wherein R1 is 0.6° C.·kg/Wh to 3.5° C.·kg/Wh.

4. The secondary battery of claim 1, wherein a relational expression R1*T=R2 is satisfied, where T is a time (seconds) taken for heat to be propagated to another secondary battery adjacent to the secondary battery, and R2 is 10° C.·kg·s/Wh to 170° C.·kg·s/Wh.

5. The secondary battery of claim 4, wherein R2 is 50° C.·kg·s/Wh to 80° C.·kg·s/Wh.

6. The secondary battery of claim 4, wherein R2 is 46° C.·kg·s/Wh to 170° C.·kg·s/Wh.

7. The secondary battery of claim 1, wherein the insulating member comprises polytetrafluoroethylene, polyphenylene sulfide, polyphenylene, or polyether ether ketone.

8. The secondary battery of claim 1, wherein the insulating member defines a member vent hole, and the cap plate defines a plate vent hole in a region corresponding to the member vent hole, and a safety vent is attached to the plate vent hole.

9. The secondary battery of claim 8, wherein a relational expression (A1/A2)/E=R3 is satisfied, where A1 is a size of the insulating member (mm$^2$), A2 is a size of the member vent hole (mm$^2$), and R3 is 0.01 kg/Wh to 0.1 kg/Wh.

10. The secondary battery of claim 9, wherein the size of the member vent hole is the same as or smaller than that of the plate vent hole.

11. The secondary battery of claim 9, wherein the insulating member is in close contact with the cap plate and is spaced apart from the electrode assembly.

12. The secondary battery of claim 9, wherein the member vent hole is blocked by the safety vent.

13. The secondary battery of claim 8, wherein the insulating member defines two electrolyte injection holes on opposite sides of the member vent hole.

\* \* \* \* \*